TELEVISION RECEIVER

Filed Feb. 4, 1959

INVENTOR.
Richard G. O'Fallon
BY
Attys.

1

2,917,661

TELEVISION RECEIVER

Richard G. O'Fallon, Westchester, Ill., assignor to Motorola, Inc., Chicago, Ill., a corporation of Illinois Application February 4, 1959, Serial No. 791,128

9 Claims. (Cl. 315—27)

This invention relates to television receivers and more particularly to the line or horizontal deflection systems of such receivers. This application is a continuation in part of my copending application Serial No. 726,234, filed April 3, 1958, now abandoned.

In present day television receivers the output stage for line deflection of the cathode ray beam in the picture tube includes a driver tube and an output auto transformer applying sawtooth current signals to a beam deflection yoke at a frequency of 15.75 kilocycles. Energy appearing in the transformer is also used to furnish high voltage to the picture tube screen and to develop a bootstrap, or boosted B-plus, potential useful in other portions of the receiver. A damper diode and associated boost capacitor coupled to the output transformer are used to develop this bootstrap voltage and at the same time the damper diode assists in achieving rapid retrace of the beam without undesirable oscillation in the circut, which otherwise can adversely affect the early trace portion of the sweep signal thereby causing non-linear beam scanning.

The damper diode ordinarily has a filament which is heated by a filament circuit operating at a comparatively low voltage and one which also energizes filaments of other tubes in the receiver. At the time of beam retrace when the driver tube is cut off and the stored energy in the inductance of the output system is released for free oscillation, the instantaneous potential on the cathode of the damper diode swings several thousand volts positive. Accordingly, an extremely high potential difference may exist between the cathode and filament of the diode and this can cause breakdown of the cathode-filament insulation. While the portion of the transformer across which the damper diode is coupled can be varied by changing the point to which the cathode is coupled to reduce the voltage so developed, such a change may cause reduction in the efficiency of the deflection system.

Accordingly, it is an object of the present invention to reduce the filament, or heater, to cathode potential in the damper diode in a line deflection system of a television receiver.

Another object is to provide a simple and inexpensive circuit to improve the useful operating life of a damper diode in the output circuit of the line deflection system of a television receiver, while still maintainng desirable efficiency in the system.

A further object is to provide an improved circuit for the horizontal output stage in a television receiver to minimize the tendency for direct current saturation in the horizontal output transformer.

A still further object is to provide a damper rectifier circuit for a television receiver in which the potentials on such a rectifier are reduced to extend rectifier life and prevent breakdown in the rectifier.

A feature of the invention is the connection of a horizontal output transformer to a damper diode device so as to apply the signal potential developed at the time of beam retrace between the cathode and anode of the damper diode device in two portions of opposite polarity to reduce the effective filament-cathode potential in the diode.

2

Another feature is the provision of a damper diode coupled across winding portions of a horizontal output autotransformer, with the winding portions intercoupled through a bootstrap capacitor and a B-plus connection and signal ground point established on one winding portion of the transformer remote from the connection thereof to the diode anode so that the voltages across portions of the transformer applied to the diode have opposite polarities with respect to ground.

Another feature is the provision of such a damper and bootstrap circuit in which the rectifier is in two sections to reduce interelectrode potentials.

Further objects, features and the attending advantages of the invention will be apparent upon consideration of the following description when taken in conjunction with the accompaying drawing in which.

Figures 1, 2:
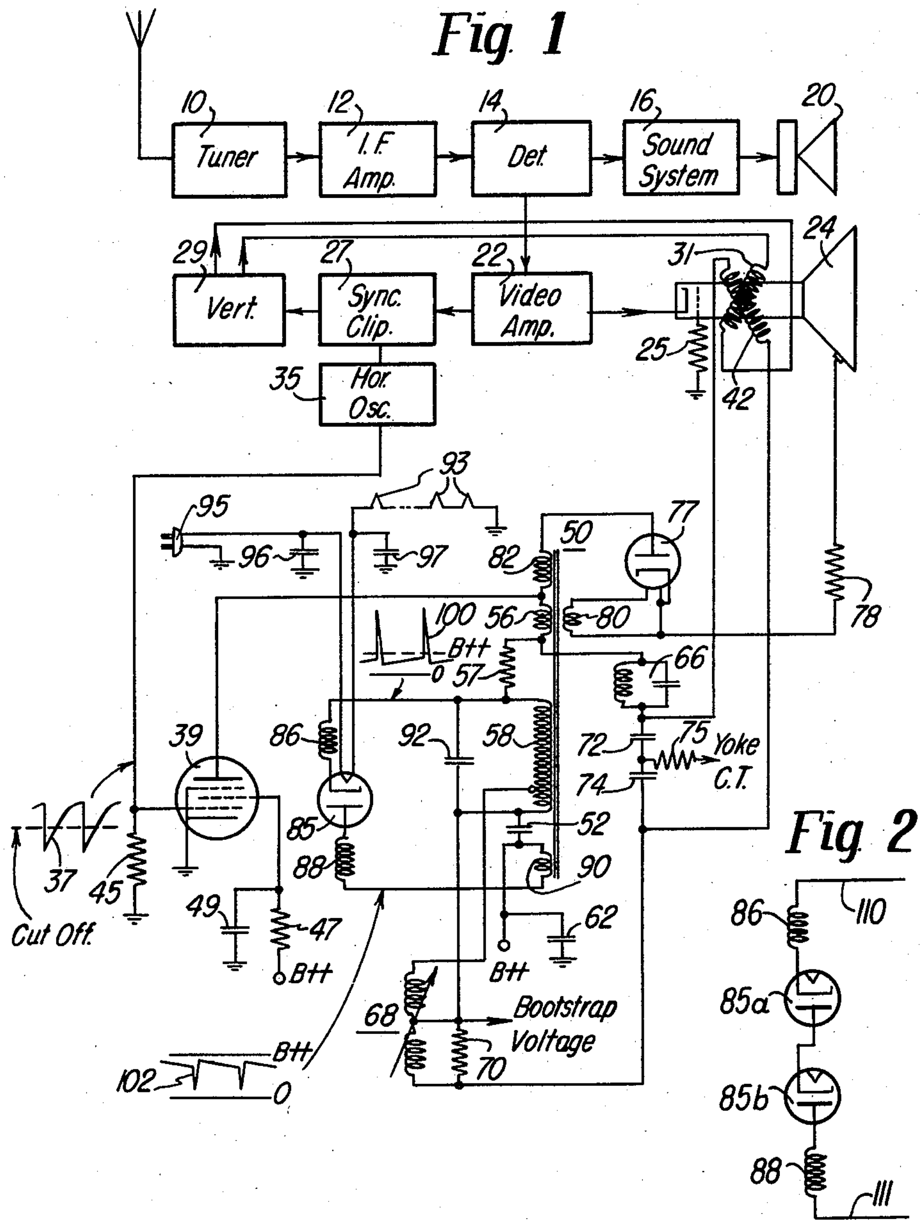
Fig. 1 is a schematic diagram showing the preferred form of the invention.
Fig. 2 shows a modification of the circuit of Fig. 1.

In practicing the invention there is provided a line deflection system for a television receiver, including a horizontal output transformer having winding portions intercoupled through a capacitor. An output tube in the deflection system is connected to conduct through the winding portions and a damper diode is connected across the winding portions and the capacitor. A B-plus connection is made to the winding portion connected to the anode of the diode at a point remote from such connection so that an effective signal ground (due to the bypassing of B-plus at signal frequencies) is established intermediate the anode and cathode connection of the diode on the transformer in order that voltage pulses in the transformer developed upon cut off of the output tube are applied with opposite polarity to the diode anode and cathode. Accordingly by proportioning the ratio of turns of the winding portions, the maximum instantaneous potential on the cathode with respect to ground, or the reference point, may be reduced well below the breakdown potential between a relatively low potential filament circuit for the diode and its cathode.

In Fig. 1, portions of the television receiver shown which are of conventional construction are shown in block form. Received television signals are applied to the tuner 10 which selects one and forms a signal of intermediate frequency which is applied to the intermediate frequency amplifier 12. The signal is then coupled to a detector 14 from which is derived the sound carrier which is applied to the sound system 16 for demodulation and amplification to drive the loudspeaker 20. Detector 14 also provides video signals which are applied to the video amplifier 22 and these are coupled to the cathode of the picture tube 24. A control grid of the picture tube is connected to ground through a grid leak resistor 25.

Synchronizing portions of the video signal are also applied from the video amplifier 22 to a synchronizing signal separator or sync clipper 27. Signals from the circuit 27 are used to synchronize vertical deflection system 29 which drives the vertical winding 31 of a deflection yoke supported on the neck of the picture tube 24. Synchronizing signals that are at horizontal or line frequency (15.75 kc.) are also applied from the circuit 27 to the horizontal oscillator 35 which develops a signal 37 to control the horizontal output tube 39. As explained more fully below, tube 39 and its associated circuitry provide sawtooth signals to energize the horizontal deflection winding 42 of the deflection yoke supported on the neck of tube 24.

Signal 37 is applied across input resistor 45 which is connected between the control grid and cathode of tube 39. The cathode is also connected to ground. The screen grid of tube 39 is connected to B++ through resistor 47 and is by-passed to ground by means of capacitor 49. Signal 37 has a peak to peak value such that the horizontal output tube 39 conducts during the upper half of this signal.

The conduction path (at signal frequencies) for tube 39 is from the anode thereof and through portions of the horizontal output transformer 50 and bootstrap capacitor 52 to B++. This path, during the instantaneous conduction of tube 39, is through winding portion 56, resistor 57, winding portion 58, and bootstrap capacitor 52. Resistor 57 is of a low value and provides a shifting of the center of the deflected beam in the picture tube 24. Capacitor 62 is connected between B++ and ground and represents the usual filtering of this potential which establishes it at essentially zero or negligible impedance with respect to ground for signal frequencies.

The horizontal deflection yoke winding 42 is connected across winding portion 58 of the horizontal output transformer 50 and resistor 57. This connection of the yoke is made through a parallel connected inductor and capacitor forming trap 66 and through the lower part of size control inductor 68. A portion of the inductor 68 is connected to a tap of winding portion 58 of the horizontal output transformer and the remaining portion of the inductor 68 is connected in series with the deflection yoke and to the junction of winding portion 58 and capacitor 52. This portion of the size control inductor is connected in parallel with a resistor 70. Capacitors 72 and 74 are connected in series across the yoke winding 42 and these tend to prevent ringing or oscillation of signals therein. The junction of capacitor 72 and 74 is connected through resistor 75 to a center tap of winding 42 (not shown).

High voltage for the screen of the picture tube 24 is obtained from the cathode of the diode rectifier 77 and applied through a resistor 78. A winding 80 of the transformer 50 provides filament voltage for rectifier 77 and the anode thereof is connected through winding portion 82 of the transformer 50 to the anode of output tube 39. As is known in the art, during retrace of the cathode ray beam a high voltage exists across the transformer 50 and this is rectified to furnish 16–18,000 volts for the screen of tube 24.

The damper diode 85 has a cathode connected through choke 86 to the junction of resistor 57 and winding portion 58. The anode of diode 85 is connected through a choke 88 and winding portion 90 of transformer 50 to B++. Chokes 86 and 88 tend to reduce the tendency for oscillation in the system and capacitor 92, which is connected across the winding portion 58, reduces adverse effects of stray capacity in the transformer 50.

A filament, or heater, for diode 85 is shown connected in series with filaments 93 of other tubes in the receiver and these are all series connected across the line cord plug 95 adapted to be connected to the standard 115 volt power main. Capacitors 96 and 97 are shown connected between each side of the filament of diode 85 to ground and these establish the filament at ground potential for signals of the line deflection frequency.

After signal 37 has reached its peak value, it suddenly decreases in value and drives tube 39 to a point below cut-off at which time the stored energy in transformer 50 causes the transformer-yoke combination to oscillate at the natural resonant frequency of the system, which is considerably above the line frequency. As this oscillatory signal reverses polarity (during retrace) the potential across diode 85 eventually causes it to conduct. Diode 85 then conducts to charge capacitor 52. This charge produces a potential across bootstrap capacitor 52 such that its terminal connected to winding portion 58 is at a high positive potential with respect to ground and this may be of the order of 600 volts. Such a bootstrap voltage may be used for other portions of the receiver as is a practice known and understood in the art. It may also be seen that as diode 85 conducts it will place a low impedance across a portion of transformer 50 and the yoke winding 42 which damps the tendency for further oscillation thereof at its natural resonant frequency. The start of conduction of diode 85 begins the trace sginal for the beam and as it continues to conduct, the signal 37 applied to output tube 39 eventually reaches a point to cause conduction of this driver tube and current flow therethrough then establishes the remainder of the sawtooth signal for finishing the beam trace.

As previously explained, the filament of the damper diode 85 is essentially at ground potential due to the energization thereof by a circuit having very low or negligible impedance at the line deflection frequency. Furthermore, at the start of retrace when the control grid of tube 39 is rapidly driven below cut-off the potential established by the stored energy in the transformer and yoke produces a high instantaneous positive potential on the cathode of diode 85 which may be several thousand volts above ground potential. Such a potential may cause a breakdown of the filament to cathode insulation in the diode 85. However, in this system the B++ connection to winding portion 90 of transformer 50 establishes ground potential at signal frequencies at a point intermediate the section of transformer 50 across which diode 85 is connected. Accordingly, during retrace the instantaneous positive going pulse 100 is developed at the cathode and an instantaneous negative going pulse 102 is developed at the anode of tube 85, and the total potential difference across the diode may be the same as in conventional systems but the maximum positive potential of the cathode can be reduced by the amount by which the anode is driven in a negative direction, thereby greatly reducing the filament to cathode potential and the tendency for breakdown. In a system of practical construction, winding portion 90 had approximately 15% of the turns of winding portion 58. Obviously other ratios may also be used. The exact requirements of diode 85 and other design considerations will determine the specific values of components but proper proportioning of winding portions 58 and 90 can maintain the filament-cathode potential within the safe limits. Pulse 102 is made large enough (in a negative direction) to bring the heater cathode potential within safe limits.

It may also be seen that conduction in transformer 50 through winding portions 56 and 90 will be in opposite directions during different portions of the deflection signal development. The average flow of these currents reduces tendency for saturation of the core of transformer 50 so that a more desirable transformer construction is possible.

In Fig. 2 there is shown diodes 85*a* and 85*b* connected in series in place of diode 85 of Fig. 1. The cathode of diode 85*b* is coupled to the anode of diode 85*a* and the cathode of this latter diode is coupled to choke 86. The anode of diode 85*b* is coupled to choke 88. Chokes 86 and 88 are respectively connected through leads 110 and 111 to the junction of resistor 57 and winding 58 and to the lower end of winding 90.

In this form of the circuit the filaments would be coupled in a manner similar to such connection in Fig. 1 and the cathode to filament potentials in both rectifier sections will be reduced for the reasons previously described. It is to be noted that the maximum filament-cathode potential of diode 85*a* may exceed that of diode 85*b* since the latter is developed by capacitive coupling. The circuit of Fig. 2 has the advantage that the inverse cathode to anode potentials are reduced over those developed in the circuit of Fig. 1.

In a circuit of the type explained, the location of the connection of the damper diode cathode to the autotransformer winding may be made at a point selected for maximum efficiency and desired circuit operation without concern for the heater-cathode insulation limitations of a particular damper diode. The cathode may then be maintained within a given potential limitation on this diode by including a portion of the transformer winding in the anode to B+ circuit for the damper diode.

I claim:

1. In a horizontal deflection system for developing line sweep signals in a television receiver, circuit means providing pulse signals at the line frequency including an output tube rendered conductive and nonconductive, a horizontal output transformer coupled to said tube to be energized by the signals therefrom and having winding means through which said output tube conducts, potential supply means connected to said winding means at an intermediate point thereof, said potential supply means having negligible impedance with respect to a reference point at signal frequency and supplying a potential positive with respect to said point, damper diode means having cathode and anode electrodes, means providing a pulse signal coupling interconnection from said cathode electrode to a point of said winding means remote from said intermediate point on the side thereof coupled to said output tube, means providing a pulse signal coupling interconnection of said anode electrode to a second point of said winding means remote from said intermediate point and on the other side thereof, so that pulse signals of opposite polarity with respect to the reference point are applied from said transformer to said cathode and anode electrodes of said damper diode means upon cut off of said output tube, and a deflection yoke coupled to said transformer for utilizing signals from said transformer.

2. A line deflection system for a television receiver, including in combination, circuit means providing line deflection control signals, an output tube having input elements and an anode element, a connection of said input elements to said circuit means for applying the control signals to said tube and causing conduction and nonconduction thereof, an output transformer having first and second winding portions, a capacitor series coupled between said winding portions, a connection from the free end of said first winding portion to said anode element, damper rectifier means having input and output electrodes and filament means for heating said input electrode, a circuit for energizing said filament means and having negligible impedance at signal frequencies with respect to a reference point, a connection from said input electrode to said first winding portion, a signal coupling circuit between said output electrode and the free end of said second winding portion for applying signals of line frequency to said output electrode, a deflection yoke coupled to said output transformer, and means supplying a positive direct current voltage high with respect to the reference point to said second winding portion remote from the end thereof coupled to said output electrode, so that upon nonconduction of said output tube a pulse of positive polarity is applied from said transformer to said input electrode and a pulse of negative polarity is applied from said transformer to said output electrode, said winding portions being proportioned to limit the maximum input electrode to filament means potential in said rectifier means to a value below the breakdown potential of the insulation thereof.

3. In a horizontal deflection system for developing line sweep signals in a television receiver, circuit means providing signals at the line frequency including an output tube rendered conductive and nonconductive, a horizontal output transformer coupled to said tube to be energized by the signals therefrom and having winding means through which said output tube conducts, potential supply means connected to said winding means at an intermediate point thereof, said potential supply means having negligible impedance with respect to a reference point at signal frequencies and supplying a potential positive with respect to said point, a damper diode having a cathode and an anode, means providing a signal coupling interconnection from said cathode to a point of said winding means remote from said intermediate point on the side thereof coupled to said output tube, means providing a signal coupling interconnection of said anode to a second point of said winding means remote from said intermediate point and on the other side thereof, so that pulse signals of line frequency and of opposite polarity with respect to the reference point are applied from said transformer to said cathode and anode of said damper diode upon cut off of said output tube, and a deflection yoke coupled to said transformer for utilizing sigals from said transformer.

4. In a television receiver, a horizontal deflection system for developing line sweep signals including in combination, circuit means providing signals at the line frequency, an output tube rendered conductive and nonconductive by such signals, a horizontal output transformer coupled to said output tube and having first and second winding portions, a damper diode having a filament and a cathode and an anode, an energizing circuit coupled to said filament and having low impedance to a reference point at signal frequencies, line frequency pulse coupling means connecting said cathode to said first winding portion, line frequency pulse coupling means connecting said anode to said second winding portion, a potential source for supplying a positive direct current energizing potential and having low impedance to the reference point at signal frequencies, means connecting said winding portions together and to said potential source at respective points of said winding portions remote from said signal coupling connections, whereby upon cut off of said output tube a pulse of positive polarity is applied from said transformer to said cathode and a pulse of negative polarity to said anode, said first and second winding portions having a turns ratio such that the pulse of positive polarity is below the filament-cathode breakdown potential in said damper diode.

5. A line deflection system for a television receiver, including in combination, circuit means providing line deflection control signals, an output tube having input elements and an anode element, a connection of said input elements to said circuit means for applying the control signals to said tube and causing conduction and nonconduction thereof, an output transformer having first and second winding portions, a capacitor series coupled between said winding portions, a connection from the free end of said first winding portion to said anode element, a damper diode having a filament and a cathode electrode and an anode electrode, a circuit for energizing said filament and having negligible impedance at signal frequencies with respect to a reference point, a pulse coupling connection from said cathode electrode to said first winding portion, a pulse coupling circuit between said anode electrode and the free end of said second winding portion for applying signals of line frequency to said anode electrode, a deflection yoke coupled to said output transformer, and means supplying a positive direct current voltage high with respect to the reference point to said second winding portion remote from the end thereof coupled to said anode electrode, so that upon nonconduction of said output tube a pulse of positive polarity is applied from said transformer to said cathode electrode and a pulse of negative polarity is applied from said transformer to said anode electrode, said winding portions being proportioned to limit the maximum cathode to filament potential in said diode to a value below the breakdown potential of the insulation thereof.

6. A line deflection system for a television receiver, including in combination, circuit means providing line deflection control signals, an output tube having input elements and an anode element, a connection of said input elements to said circuit means for applying the control signals to said tube and causing alternate conduction and nonconduction thereof, an autotransformer having first, second and third winding portions each with first and second end terminals, a connection from the first end terminal of said first winding portion to said anode element, a resistor connected between said second terminal of said first winding portion and said first terminal of said second winding portion, a bootstrap capacitor connected between said second terminal of said second winding portion and said first terminal of said third winding portion, a damper diode having a filament and a cathode electrode and an anode electrode, a circuit for energizing said filament, said circuit having negligible impedance at signal frequencies with respect to a reference point, a pulse coupling connection from said cathode electrode to said first terminal of said second winding portion, a coupling circuit for applying pulse signals of line frequency between said anode electrode and the second terminal of said third winding portion, a deflection yoke coupled between said second terminal of said first winding portion and the second terminal of said second winding portion, means supplying a direct current voltage positive with respect to the reference point, said means being coupled to said first terminal of said third winding portion, so that upon nonconduction of said output tube a potential of positive polarity is applied from said autotransformer to said cathode electrode and a potential of negative polarity is applied from said autotransformer to said anode electrode, said second and third winding portions having a turns ratio to limit the maximum cathode to filament potential in said damper diode to a value below the breakdown potential of the insulation thereof.

7. In a television receiver, a horizontal deflection system for developing line sweep signals including in combination, circuit means providing signals at the line frequency, an output tube rendered conductive and nonconductive by such signals, a horizontal output transformer coupled to said output tube and having first and second winding portions, a first damper diode having filament means and a first cathode and a first anode, a second damper diode having further filament means and a second cathode and a second anode, an energizing circuit coupled to said filament means and having low impedance to a reference point at signal frequencies, means interconnecting said first anode and said second cathode, pulse signal coupling means connecting said first cathode to said first winding portion, pulse signal coupling means connecting said second anode to said second winding portion, a potential source for supplying a positive direct current energizing potential and having low impedance to the reference point at signal frequencies, means connecting said winding portions together and to said potential source at respective points of said winding portions remote from said signal coupling connections, whereby upon cut off of said output tube a pulse potential of positive polarity is applied from said transformer to said first cathode and a pulse potential of negative polarity is applied to said second anode, said first and second winding portions having a turns ratio such that the potential of positive polarity is below the fialment-cathode breakdown potential in said first damper diode.

8. In a horizontal deflection system for developing line sweep signals in a television receiver, circuit means providing signals at the line frequency including an output tube rendered conductive and non-conductive and having cathode and anode elements, means connecting said cathode element to a reference point, a horizontal output transformer to be energized by the signals from said output tube and having winding means connected to said anode and through which said output tube conducts, bootstrap rectifier means having a cathode electrode connected to said winding means, said rectifier means having an anode electrode connected to a point of said winding means remote from the connection thereof to said cathode electrode and to said anode element of said output tube, a capacitor series coupled with said anode electrode and at least a portion of said winding means for developing a potential for energizing said anode element of said output tube through at least a portion of said winding means, means for supplying a potential positive with respect to the reference point to the inter-connection of said anode electrode and said capacitor, further capacitor means coupled between the reference point and a point of said winding means intermediate the connection thereof to said cathode and anode electrodes for by-passing such point at line signal frequencies, and a deflection yoke coupled to said output transformer for utilizing signals developed therein.

9. In a horizontal deflection system for developing line sweep signals in a television receiver, circuit means providing signals at the line frequency including an output tube rendered conductive and non-conductive and having cathode and anode elements, means connecting said cathode element to a reference point, a horizontal output transformer to be energized by the signals from said output tube and having winding means connected to said anode and through which said output tube conducts, bootstrap rectifier means comprising series connected diodes and having a cathode electrode connected to said winding means, said rectifier means also having an anode electrode connected to a point of said winding means remote from the connection thereof to said cathode electrode and to said anode element of said output tube, a capacitor series coupled with said anode electrode and at least a portion of said winding means for developing a potential for energizing said anode element of said output tube through at least a portion of said winding means, means for supplying a potential positive with respect to the reference point to the inter-connection of said anode electrode and said capacitor, means for bypassing a point of said winding means to the reference point at line signal frequencies, and a deflection yoke coupled to said output transformer for utilizing signals developed therein.

No references cited.